(12) United States Patent
Kim et al.

(10) Patent No.: US 10,664,961 B2
(45) Date of Patent: May 26, 2020

(54) INVERSE TONE MAPPING METHOD

(71) Applicants: SILICON WORKS CO., LTD., Daejeon (KR); Korea Advanced Institute of Science and Technology, Daejeon (KR)

(72) Inventors: Yong Woo Kim, Seongnam-si (KR); Sang Yeon Kim, Yongin-si (KR); Woo Suk Ha, Yongin-si (KR); Mun Churl Kim, Daejeon (KR); Dae Eun Kim, Daejeon (KR)

(73) Assignees: SILICON WORKS CO., LTD., Daejeon (KR); Korea Advanced Institute of Science and Technology, Daejeon (KR)

( * ) Notice: Subject to any disclaimer, the term of this patent is extended or adjusted under 35 U.S.C. 154(b) by 182 days.

(21) Appl. No.: 15/633,763

(22) Filed: Jun. 27, 2017

(65) Prior Publication Data

US 2017/0372461 A1 Dec. 28, 2017

(30) Foreign Application Priority Data

Jun. 28, 2016 (KR) .......................... 10-2016-0080971

(51) Int. Cl.
| | |
|---|---|
| *G06K 9/00* | (2006.01) |
| *G06K 9/40* | (2006.01) |
| *G06T 5/00* | (2006.01) |
| *G06T 7/90* | (2017.01) |
| *G06T 5/10* | (2006.01) |
| *G06T 5/20* | (2006.01) |

(52) U.S. Cl.
CPC .............. *G06T 5/009* (2013.01); *G06T 5/001* (2013.01); *G06T 5/007* (2013.01); *G06T 5/10* (2013.01); *G06T 5/20* (2013.01); *G06T 7/90* (2017.01); *G06T 2207/10024* (2013.01); *G06T 2207/20021* (2013.01); *G06T 2207/20028* (2013.01); *G06T 2207/20081* (2013.01); *G06T 2207/20208* (2013.01)

(58) Field of Classification Search
USPC .................................................. 382/167, 274
See application file for complete search history.

(56) References Cited

U.S. PATENT DOCUMENTS

| | | | | |
|---|---|---|---|---|
| 6,163,621 | A * | 12/2000 | Paik .................... | G06K 9/00442 382/169 |
| 6,175,425 | B1 * | 1/2001 | Khorram ............ | H04N 1/40062 358/1.9 |

(Continued)

FOREIGN PATENT DOCUMENTS

JP 2017-500651 A 1/2017

*Primary Examiner* — Kathleen Y Dulaney
(74) *Attorney, Agent, or Firm* — Fenwick & West LLP (57) ABSTRACT

The present invention provides a technology that separates a low-contrast-ratio image into sublayer images, classifies each sublayer image into several categories in accordance with the characteristics of each sublayer image, and learns a transformation matrix representing a relationship between the low-contrast-ratio image and a high-contrast-ratio image for each category. In addition, the present invention provides a technology that separates an input low-contrast-ratio image into sublayer images, selects a category corresponding to each sublayer image, and applies a learned transformation matrix to generate a high.

9 Claims, 12 Drawing Sheets

(56) References Cited

U.S. PATENT DOCUMENTS

| | | | |
|---|---|---|---|
| 6,654,504 B2 * | 11/2003 | Lubin | G06T 5/50 382/254 |
| 7,310,445 B2 * | 12/2007 | Kupeev | H04N 19/176 375/E7.139 |
| 9,324,133 B2 * | 4/2016 | Choudhury | G06T 3/4053 |
| 2002/0172431 A1 * | 11/2002 | Atkins | G06T 5/20 382/260 |
| 2003/0026495 A1 * | 2/2003 | Gondek | G06T 5/20 382/261 |
| 2006/0153441 A1 * | 7/2006 | Li | H04N 1/40068 382/162 |
| 2006/0204054 A1 * | 9/2006 | Steinberg | H04N 5/232 382/118 |
| 2007/0160285 A1 * | 7/2007 | Gondek | G06T 5/20 382/162 |
| 2008/0253655 A1 * | 10/2008 | Liao | G06K 9/00456 382/176 |
| 2008/0285853 A1 * | 11/2008 | Bressan | G06T 5/009 382/169 |
| 2010/0053367 A1 * | 3/2010 | Nanu | G06K 9/00248 348/224.1 |
| 2010/0054592 A1 * | 3/2010 | Nanu | G06T 5/008 382/167 |
| 2012/0155759 A1 * | 6/2012 | Kang | G06T 5/00 382/167 |
| 2013/0169760 A1 * | 7/2013 | Watts | G06K 9/40 348/47 |
| 2014/0072208 A1 * | 3/2014 | Kenyon | G06K 9/80 382/159 |
| 2014/0072242 A1 * | 3/2014 | Wei | H04N 19/176 382/299 |
| 2015/0269708 A1 * | 9/2015 | Porikli | G06T 3/4007 382/160 |
| 2016/0093022 A1 * | 3/2016 | Lee | H04N 7/0117 382/300 |
| 2018/0365819 A1 * | 12/2018 | Green | G06T 7/0002 |

* cited by examiner

INVERSE TONE MAPPING METHOD

CROSS REFERENCE TO RELATED APPLICATION

This application claims priority from Korean Patent Application No. 10-2016-0080971, filed on Jun. 28, 2016, which is hereby incorporated by reference for all purposes as if fully set forth herein.

BACKGROUND

1. Field of the Invention

The present invention relates to image processing technology.

2. Description of the Prior Art

In converting a low-contrast-ratio image to a high-contrast-ratio image, conventionally, one function that extends the dynamic range of pixel values has been equally applied to the entire image, an area in a screen has been divided so that a dynamic range of a bright portion is further expanded, or an expansion map that determines required expansion ranges for respective locations has been created and used.

Such a conventional method is merely for appropriately expanding the dynamic range of the pixel value of a low-contrast-ratio image, and thus is not effective in reconstructing detailed information (detailed texture, detailed contrast variation, etc.) of an image that falls within the category of a high-contrast-ratio image, i.e. does not fall within the category of a low-contrast-ratio image.

Since the low-contrast-ratio image is in a state in which a major portion of the contrast component of the pixel values for the detailed information of the image is lost due to a contrast ratio that is limited compared to that of a high-contrast-ratio image, it is necessary to improve the image quality by restoring the lost contrast components in a process of converting the low-contrast-ratio image into the high-contrast-ratio image.

SUMMARY

With this background, an aspect of the present invention is to provide an inverse mapping technology having high capability to restore detailed information of an image.

Another aspect of the present invention is to provide a technology that separates a low-contrast-ratio image into sublayer images, classifies each sublayer image into several categories in accordance with the characteristics of each sublayer image, and learns a transformation matrix representing a relationship between the low-contrast-ratio image and a high-contrast-ratio image for each category. In addition, still another aspect of the present invention is to provide a technology that separates an input low-contrast-ratio image into sublayer images, selects a category corresponding to each sublayer image, and applies a learned transformation matrix to generate a high-contrast-ratio image.

In accordance with an aspect of the present invention, there is provided an inverse tone mapping method that converts a low-contrast-ratio image into a high-contrast-ratio image, including: separating the low-contrast-ratio image into a plurality of sublayer low-contrast-ratio images using at least one separation filter; dividing each sublayer low-contrast-ratio image into a plurality of patches; determining image categories of each patch; and converting each patch into a corresponding high-contrast-ratio image patch in accordance with a transformation matrix learned for each image category to generate the high-contrast-ratio image.

In accordance with another aspect of the present invention, there is provided an inverse tone mapping method that converts a low-contrast-ratio image into a high-contrast-ratio image, including: converting a test high-contrast-ratio image into a test low-contrast-ratio image; separating the test high-contrast-ratio image into a plurality of sublayer test high-contrast-ratio images and separating the test low-contrast-ratio image into a plurality of sublayer test low-contrast-ratio images; dividing each sublayer test high-contrast-ratio image into a plurality of test high-contrast-ratio image patches and dividing each sublayer test low-contrast-ratio image into a plurality of test low-contrast-ratio image patches; determining image categories of each test low-contrast-ratio image patch; learning a transformation matrix for each image category using the test low-contrast-ratio image patch corresponding to each image category and the test high-contrast-ratio image patch corresponding to the test low-contrast-ratio image patch; and converting the input low-contrast-ratio image into the high-contrast-ratio image using the learned transformation matrix.

In accordance with still another aspect of the present invention, there is provided an inverse tone mapping method that converts a low-contrast-ratio image into a high-contrast-ratio image, including: separating the low-contrast-ratio image into a base layer low-contrast-ratio image and a detailed layer low-contrast-ratio image using a separation filter; dividing the detailed layer low-contrast-ratio image into a plurality of patches; determining image categories of each patch; converting each patch into a high-contrast-ratio image patch in accordance with a transformation matrix learned for each image category to generate a detailed layer high-contrast-ratio image; and generating the high-contrast-ratio image using the detailed layer high-contrast-ratio image.

As described above, according to the present invention, in converting a low-contrast-ratio image into a high-contrast-ratio image, an effect of increasing capability to restore detailed information of an image is obtained.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
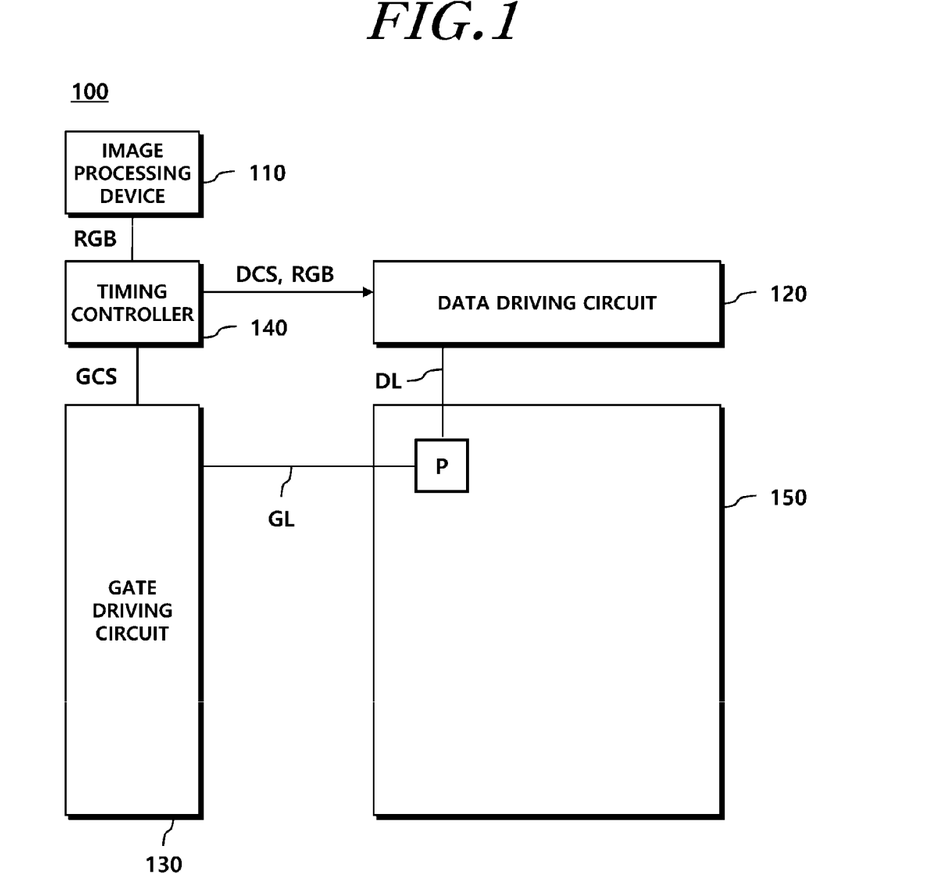
FIG. 1 is a block diagram showing a display apparatus to which embodiments can be applied.

FIG. 1 is a block diagram showing a display apparatus to which embodiments can be applied.

Referring to FIG. 1, a display apparatus 100 may include an image processing device 110, a data driving circuit 120, a gate driving circuit 130, a timing controller 140, a display panel 150, and the like.

A plurality of data lines DL and a plurality of gate lines GL may be arranged on the display panel 150, and a plurality of pixels P may be arranged thereon.

The gate driving circuit 130 may supply a gate driving signal of a turn-on voltage or a turn-off voltage to the gate line GL. When the gate driving signal of the turn-on voltage is supplied to the pixel P, the corresponding pixel P is connected to the data line DL. When the gate driving signal of the turn-off voltage is supplied to the pixel P, the connection between the corresponding pixel P and the data line DL is released.

The data driving circuit 120 supplies a data voltage to the data line DL. The data voltage supplied to the data line DL is supplied to the pixel P in accordance with the gate driving signal.

The timing controller 140 may supply a control signal to the gate driving circuit 130 and the data driving circuit 120. For example, the timing controller 140 may transmit to the gate drive circuit 120 a gate control signal GCS that causes a scan to begin. Next, the timing controller 140 may output image data RGB to the data driving circuit 120. In addition, the timing controller 140 may also transmit a data control signal DCS that controls the data driving circuit 120 to supply the data voltage to each pixel P.

The image processing device 110 may generate the image data RGB and transmit the generated image data RGB to the timing controller 140. The image processing device 110 may convert a low-contrast-ratio image into a high-contrast-ratio image to generate the image data RGB.

Figure 2:
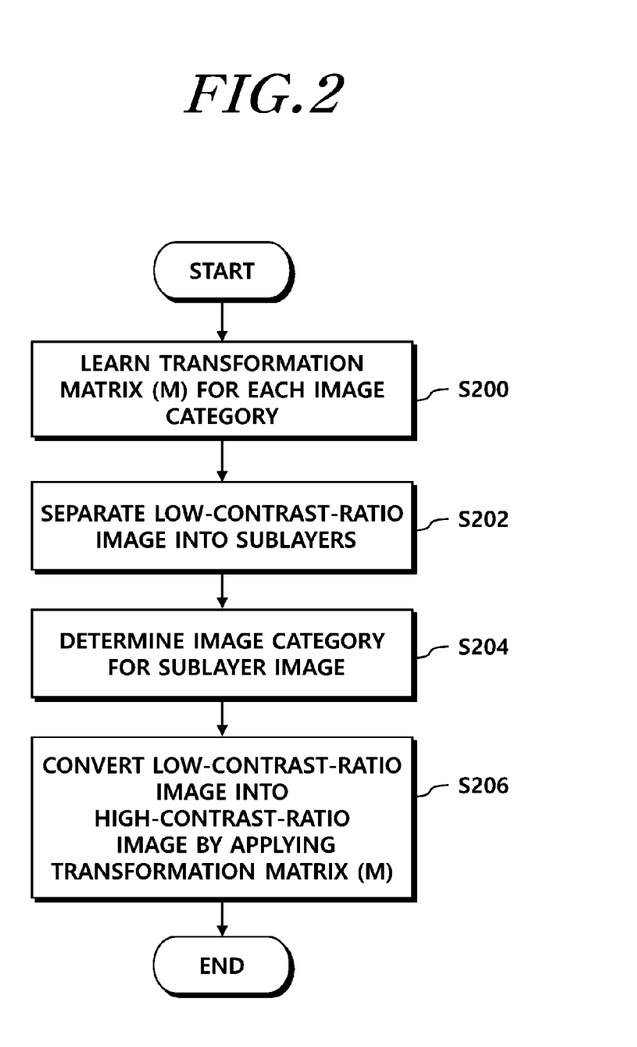
FIG. 2 is a flowchart showing an inverse tone mapping method according to an embodiment of the present invention.

FIG. 2 is a flowchart showing an inverse tone mapping method according to an embodiment of the present invention.

Referring to FIG. 2, in operation S200, an image processing device 110 may learn a transformation matrix M for each image category through a learning step. The learned transformation matrix M is used to convert an input low-contrast-ratio image into a high-contrast-ratio image.

In operation S202, the image processing device 110 may separate the input low-contrast-ratio image into sublayers. The image processing device 110 may use a separation filter to separate the image. The image may be separated into a plurality of sublayer images by the separation filter.

In operation S204, the image processing device 110 may determine image categories for the low-contrast-ratio image separated into the sublayers. By converting the image differently for each image category, the image processing device 110 may solve a conventional problem that has occurred upon application of the same function to the entire image, that is, a problem in that capability to restore detailed information is low.

In operation S206, the image processing device 110 may convert the low-contrast-ratio image into the high-contrast-ratio image by applying the transformation matrix M learned for each image category.

Meanwhile, in inverse tone mapping, the image processing device separates an image into a plurality of sublayers and converts each sublayer separately, thereby improving the accuracy of the conversion.

Figure 3:
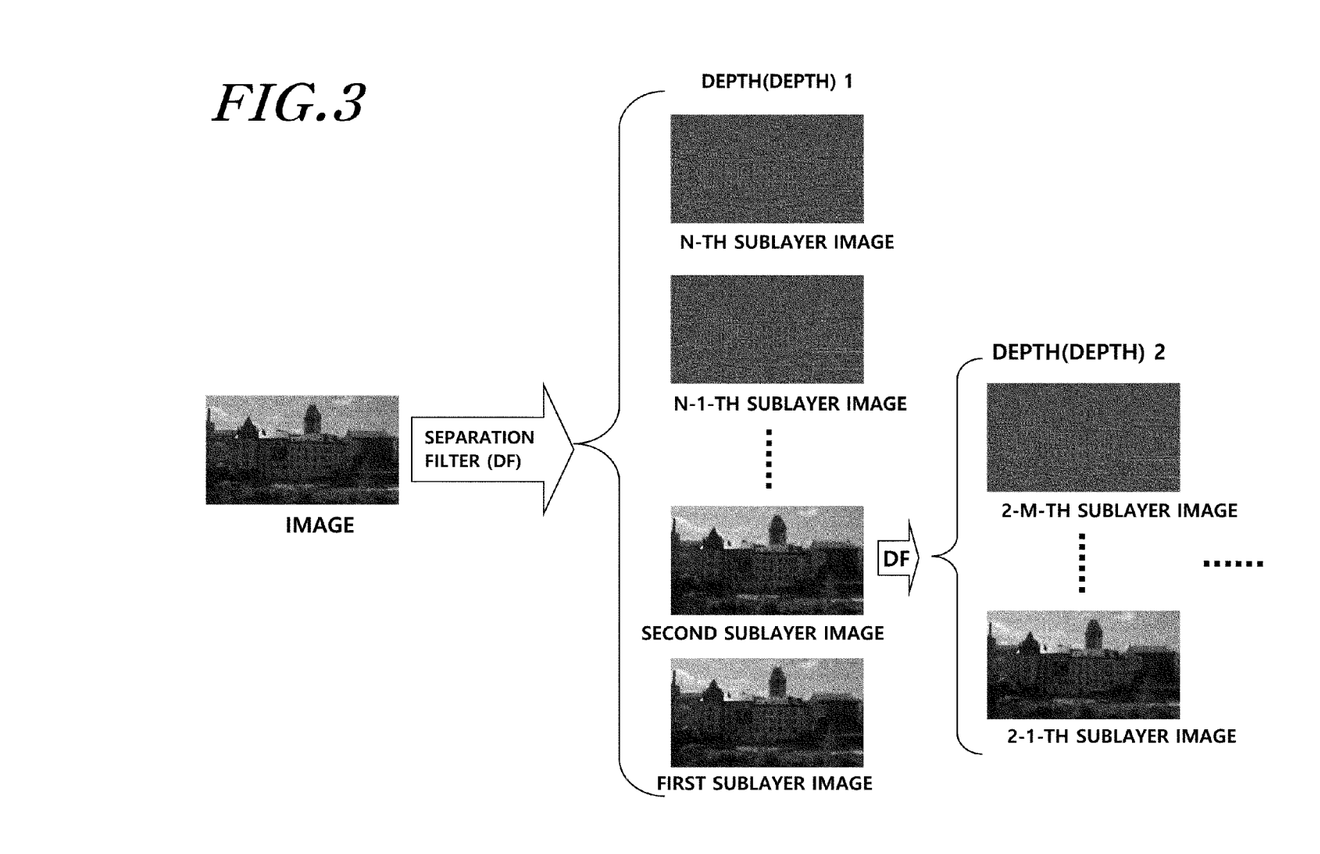
FIG. 3 is a first exemplary view showing a case in which an image is separated into a plurality of sublayer images according to an embodiment.

FIG. 3 is a first exemplary view showing a case in which an image is separated into a plurality of sublayer images.

Referring to FIG. 3, the image processing device 110 may separate an image into a plurality of sublayer images.

The image processing device may separate an image into a plurality of sublayer images using a separation filter.

As the separation filter, a bilateral filter, a decomposition filter using total-variation energy, a wavelet filter, a Gabor filter, and a Gaussian filter may be used.

The image processing device 110 may separate an image into N (where N is a natural number of 2 or greater) sublayer images using the separation filter. In addition, the image processing device 110 may separate the sublayer image into multiple layers by using the separation filter more than twice.

For example, the image processing device 110 may generate N sublayer images at a level of a depth 1 using the separation filter, and generate M (where M is a natural number of 2 or greater) sublayer images at a level of a depth 2 by applying the separation filter to the sublayer image of the level of the depth 1 again.

The image processing device 110 may separate an image until a terminal node image is displayed.

Figure 4:
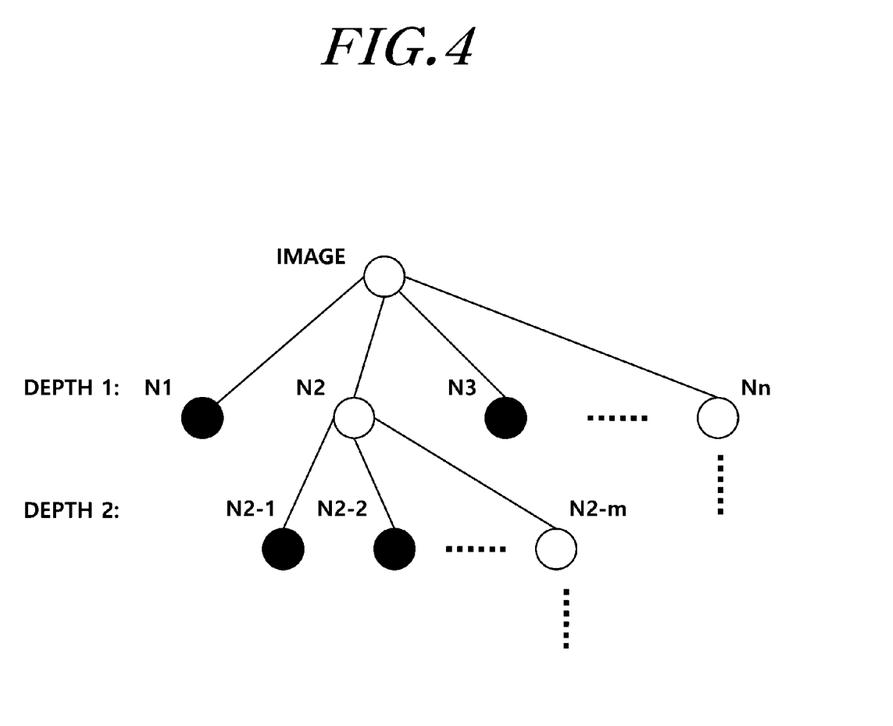
FIG. 4 is a second exemplary view showing a case in which an image is separated into a plurality of sublayer images according to an embodiment.

FIG. 4 is a second exemplary view showing a case in which an image is separated into a plurality of sublayer images.

Referring to FIG. 4, an image may be separated into a plurality of sublayer images by a separation filter.

The image may be separated into N node (N1, N2, N3, . . . , Nn) images at a level of a depth 1 by the separation filter. Terminal node (N1 and N3) images, which are not further separated by the separation filter at the level of the depth 1, may be directly determined as sublayer images.

Further, the separation filter may be further applied to the remaining images that can be additionally separated by the separation filter. For example, the second node (N2) image may be separated again into M node (N2-1, N2-2, ..., N2-$m$) images at a level of a depth 2 by the separation filter. Through this process, the image may be separated into terminal node images which are no longer separated by the separation filter.

The image processing device 110 may separate a low-contrast-ratio image into a plurality of sublayer low-contrast-ratio images using at least one separation filter, and may separate each sublayer low-contrast-ratio image into a plurality of patches.

The image processing device 110 may perform inverse tone mapping in units of a patch of the sublayer low-contrast-ratio image.

The image processing device 110 may separate the sublayer low-contrast-ratio image into a plurality of patches having a uniform size. The uniform size may mean that the screen size displayed on a display apparatus is the same, and that the number of pixels included in each patch is the same.

The image processing device 110 may determine the image categories of each patch and generate a high-contrast-ratio image by applying a transformation matrix learned for each image category.

The image categories of each patch may be determined by at least one or more factors of image signal change information using a luminance, a contrast, texture complexity, an edge direction, an edge strength, a color component, a texture pattern, a frequency, and a differential operator of each patch image, image signal change information using a Gaussian function, and image signal change information using a Laplacian function.

For example, the image processing device 110 may determine the image categories of each patch according to the luminance of each patch image and the change type of each patch image.

The image processing device 110 may calculate a mean luminance of pixels included in each patch, and classify the patches into L (where L is a natural number of 2 or greater) luminance groups according to the mean luminance.

The image processing device 110 may grasp the change type of the pixels included in each patch and classify each patch according to the change type.

Figure 5:
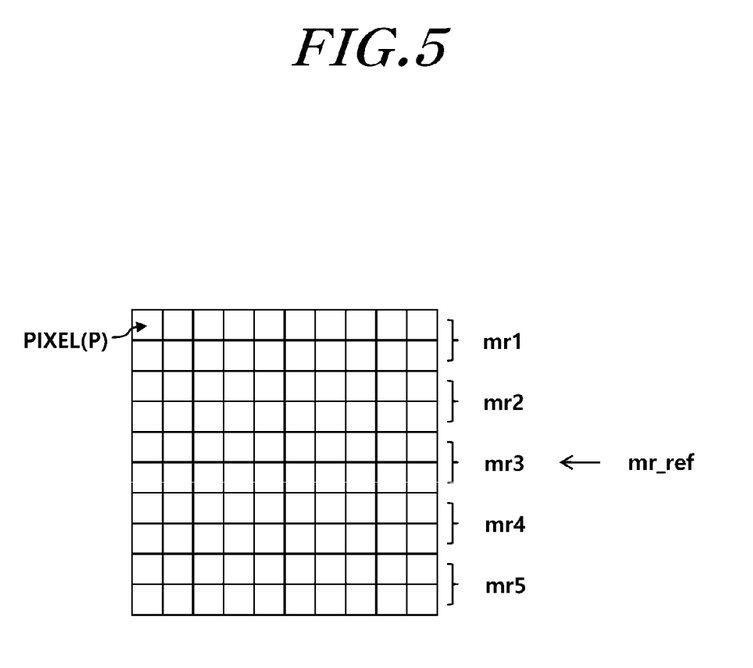
FIGS. 5 and 6 are views showing an example of defining a change type of a patch according to an embodiment.
Figure 6:
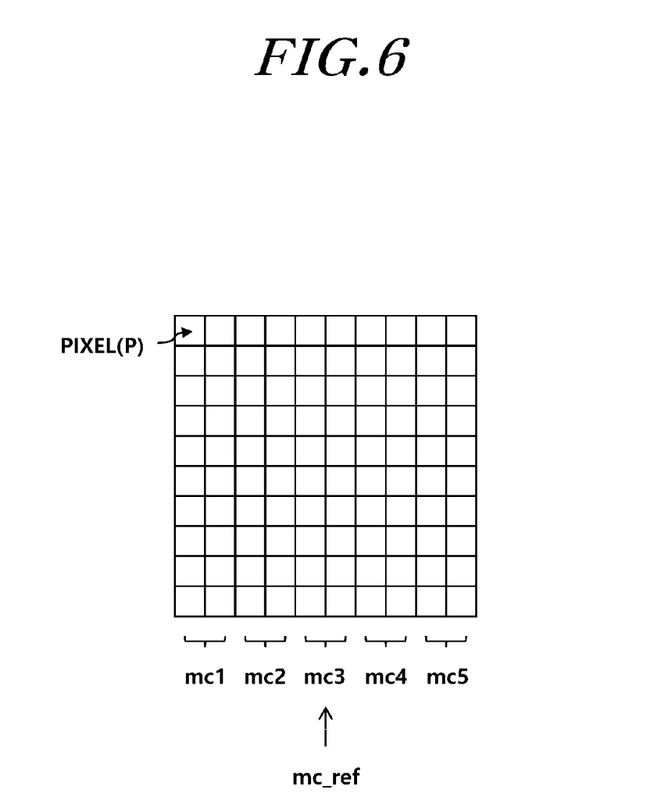

FIGS. 5 and 6 are views showing an example of defining a change type of a patch.

Referring to FIGS. 5 and 6, a plurality of pixels P may be included in a patch. The image processing device 110 may classify image categories of each patch by dividing the pixels P into a plurality of groups and comparing the mean luminance of each group with a reference group.

Referring to FIG. 5, the image processing device may group the pixels P in the horizontal direction and classify the image categories of each patch using the relative luminance of other row groups based on a middle row group. The image processing device may display all row groups in such a manner that a first row group mr1 is represented as 0 when the mean luminance of the first row group mr1 is lower than the mean luminance of a middle row group mr3 and is represented as 1 when the mean luminance of the first row group mr1 is higher than the mean luminance of the middle row group mr3. Accordingly, the image categories of the patch may be classified according to this representation. When the image processing device groups the patches into five row groups as shown in FIG. 5, the image categories are classified into 16 (16=2^(5-1)) categories.

Referring to FIG. 6, the image processing device 110 may group the pixels P in the vertical direction and classify the image categories of each patch using the relative luminance of other column groups based on a middle column group. The image processing device 110 may display all column groups in such a manner that a first column group mc1 is represented as 0 when the mean luminance of the first column group mc1 is lower than a mean luminance of a middle column group mc3 and is represented as 1 when the mean luminance of the first column group mc1 is higher than the mean luminance of the middle column group mc3. Accordingly, the image categories of the patch may be classified according to this representation. When the image processing device groups the patches into five column groups as shown in FIG. 6, the image category is classified into 16 (16=2^(5-1)) categories.

When the number of groups is generalized to Q (where Q is a natural number of 2 or greater), the image processing device 110 may divide pixels of each patch into Q groups and compare the mean luminance of a reference group with the mean luminance of each group, so that all groups may be represented as 0 or 1. At this time, according to the embodiment, 0 or 1 may be displayed only in the remaining groups excluding the reference group among all the groups. When all the groups are represented in this way by the image processing device, the image category may be classified into 2^(Q-1) categories.

When the image categories for each patch are determined, the image processing device 110 may convert each patch into a high-contrast-ratio image patch according to a transformation matrix learned for each image category to generate a high-contrast-ratio image. Here, the transformation matrix for each image category may be obtained through learning based on a predetermined image.

Figure 7:
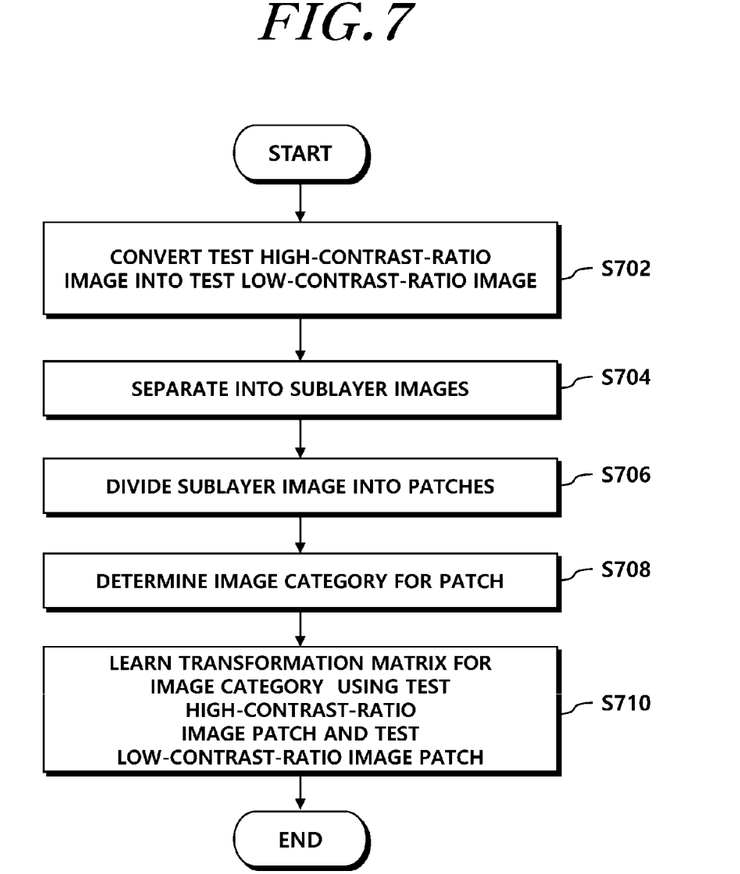
FIG. 7 is a flowchart showing a transformation matrix learning method according to an embodiment of the present invention.

FIG. 7 is a flowchart showing a transformation matrix learning method according to an embodiment of the present invention.

Referring to FIG. 7, in operation S702, the image processing device 110 may receive a test high-contrast-ratio image to be used for transformation matrix learning and convert the test high-contrast-ratio image to a test low-contrast-ratio image.

Next, in operation S704, the image processing device 110 may separate the test high-contrast-ratio image and the test low-contrast-ratio image into a plurality of sublayer test high-contrast-ratio images and a plurality of sublayer test low-contrast-ratio images, respectively. At this time, the image processing device 110 may separate the test high-contrast-ratio image and the test low-contrast-ratio image into sublayer images using the same separation filter. In addition, the image processing device 110 may use the separation filter so that the sublayer images are formed into the same node image. For example, when the image processing device separates the test high-contrast-ratio image into N sublayer images having a level of a depth 1, it is possible to separate the test low-contrast-ratio image into N sublayer images having a level of a depth 1.

In operation S706, the image processing device 110 may divide the separated sublayer images into patch units. Specifically, the image processing device 110 may divide each sublayer test high-contrast-ratio image into a plurality of test high-contrast-ratio image patches. Next, the image processing device 110 may divide each sublayer test low-contrast-ratio image into a plurality of test low-contrast-ratio image patches.

Next, in operation S708, the image processing device 110 may determine the image categories of each test lowcontrast-ratio image patch. The image categories are determined based on the low-contrast-ratio image.

In operation S710, when the image categories of each test low-contrast-ratio image patch are determined, a transformation matrix is learned for each image category. The image processing device 110 may learn the transformation matrix so that a difference between the high-contrast-ratio image patch generated by applying the transformation matrix to the test low-contrast-ratio image patch and the test high-contrast-ratio image patch is minimized.

$$M_i = \arg\min\{\|Y_i^h - MY_i^l\|_2^2 + \lambda\|M\|_F^2\}, M \in R^{D \times D}$$

$$M_i = Y_i^h Y_i^{l^T}(Y_i^l Y_i^{l^T} + \lambda I)^{-1}, i = 1, 2, \ldots, 1280 \quad [\text{Equation 1}]$$

Here, $M_i$ denotes a transformation matrix for transforming a low-contrast-ratio image patch of an i-th group into a high-contrast-ratio image patch.

$Y_i^h$ denotes a matrix constituting high-contrast-ratio image patches belonging to the i-th group.

$Y_i^l$ denotes a matrix constituting low-contrast-ratio image patches belonging to the i-th group.

M denotes a matrix for transforming a low-contrast-ratio image patch into a high-contrast-ratio image patch.

λ denotes a Lagrangian multiplier.

The transformation matrix $M_i$ may be learned for each group, for example, for every 1280 groups.

The learned transformation matrix is applied to an input low-contrast-ratio image and is used to generate a high-contrast-ratio image.

$$Y_i^h = M_i Y_i^l$$

Meanwhile, the image processing device 110 may apply the learned transformation matrix to only some sub-layer low-contrast-ratio images without applying the learned transformed matrix to all sublayer low-contrast-ratio images, as described above.

For example, the image processing device 110 may separate the low-contrast-ratio image into a low-contrast-ratio image of a base layer and a low-contrast-ratio image of a detailed layer, and the above-described learned transformation matrix may be applied to the low-contrast-ratio image of the detailed layer. The image processing device 110 may apply, to the low-contrast-ratio image of the base layer, one of an inverse tone mapping method using a global model, an inverse tone mapping method using a classification model, and an inverse tone mapping method using an expansion map.

The image processing device 110 may generate a high-contrast-ratio image by synthesizing sublayer high-contrast-ratio images transformed by different inverse tone mapping methods.

Figure 8:
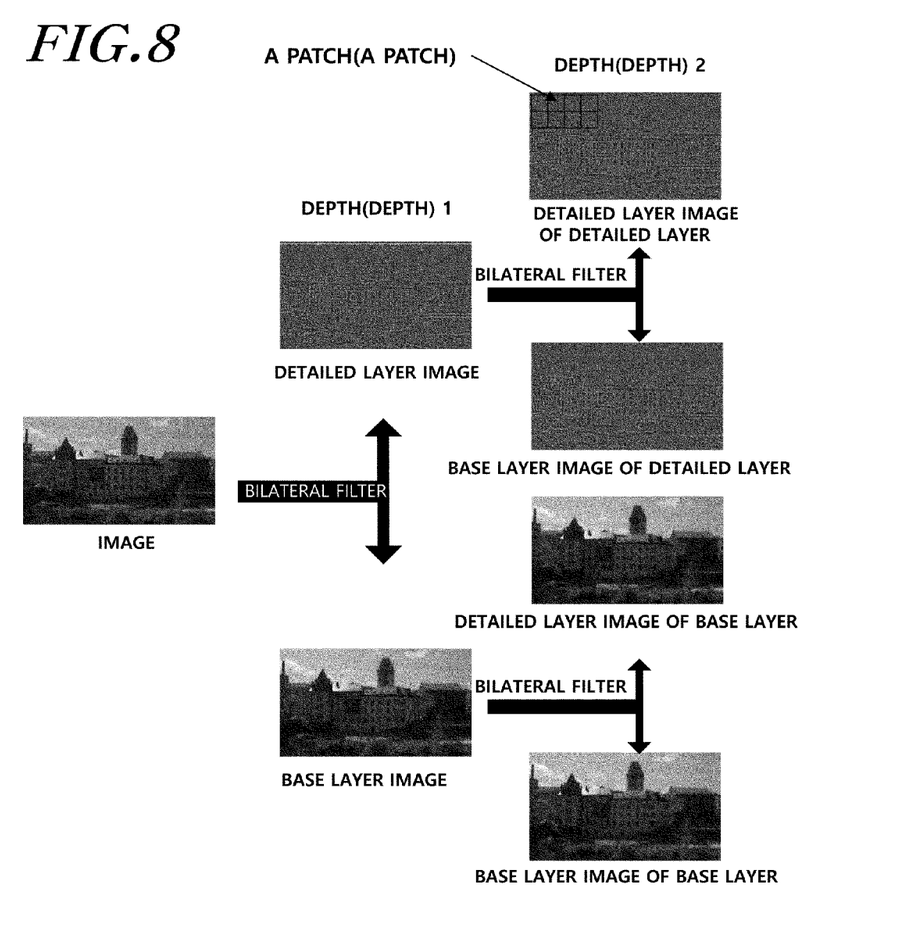
FIG. 8 is a view showing an example of separating an image into a base layer and a detailed layer according to an embodiment.

FIG. 8 is a view showing an example of separating an image into a base layer and a detailed layer.

Referring to FIG. 8, the image processing device 110 may separate an image into a base layer image and a sublayer image. Specifically, the image processing device 110 may separate a low-contrast-ratio image into a low-contrast-ratio image of a base layer and a low-contrast-ratio image of a detailed layer using a separation filter.

The separated sublayer images of a level of a depth 1 may be separated again by the separation filter. At this time, the base layer image may be separated into a base layer image of the base layer and a detailed layer image of the base layer, and the detailed layer image may be separated into a base layer image of the detailed layer and a detailed layer image of the detailed layer.

The image processing device 110 may convert the sublayer images separated into the detailed layer images at a level of a depth 1, for example, the base layer image of the detailed layer and the detailed layer image of the detailed layer into high-contrast-ratio images, by applying the learned transformation matrix to the the sublayer images. The image processing device 110 may apply a different inverse tone mapping method to the sublayer images separated into the base layer images at the level of the depth 1, for example, the base layer image of the base layer and the detailed layer image of the base layer.

Figure 9:
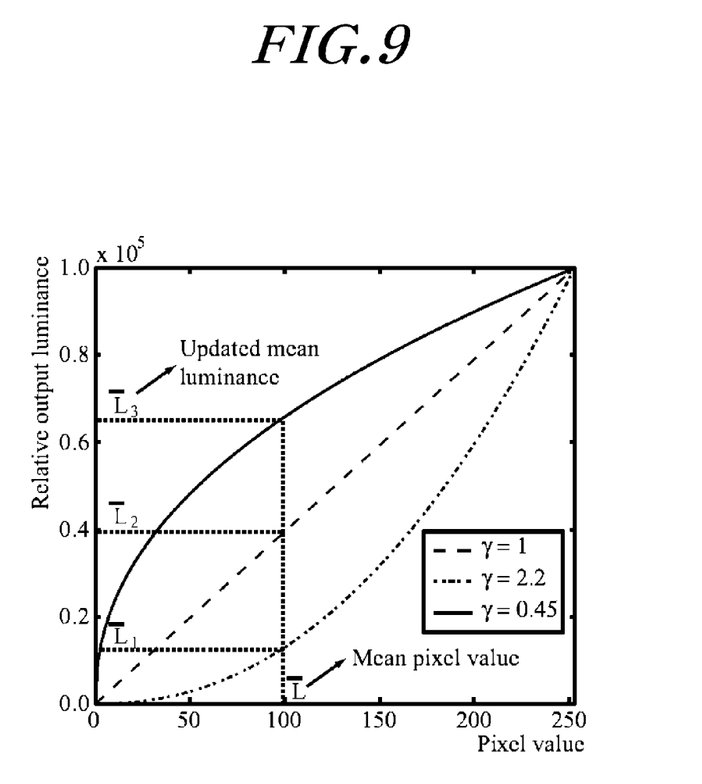
FIG. 9 is a view for explaining a first example of another inverse tone mapping method according to an embodiment.

FIG. 9 is a view for explaining a first example of another inverse tone mapping method.

The image processing device 110 may convert the contrast of each pixel using a gamma curve as shown in the graph of FIG. 9. For example, when the gamma is set to 2.2, the image processing device 110 may convert the luminance of the pixel whose contrast corresponds to L into L1. As another example, when the gamma is set to 0.45, the image processing device may convert the luminance of the pixel whose contrast corresponds to L into L3.

This method can be called an inverse tone mapping method using a global model. The inverse tone mapping method using the global model is a method in which a certain function (rule) is equally applied to all pixels of an image.

An example of the function is shown in Equation 2.

$$L' = k\left(\frac{L - L_{min}}{L_{max} - L_{min}}\right)^\gamma \quad [\text{Equation 2}]$$

Here, L' denotes the luminance of the calculated high-contrast-ratio image.

K denotes the maximum value of the luminance intensity of an output high contrast ratio display apparatus.

L denotes the luminance of an input low-contrast-ratio image and a value that is normalized to [0,1].

L max and L min are a maximum value and a minimum value of a luminance of an input low-contrast-ratio image.

γ denotes a factor that determines nonlinearity of a scale.

Figure 10:
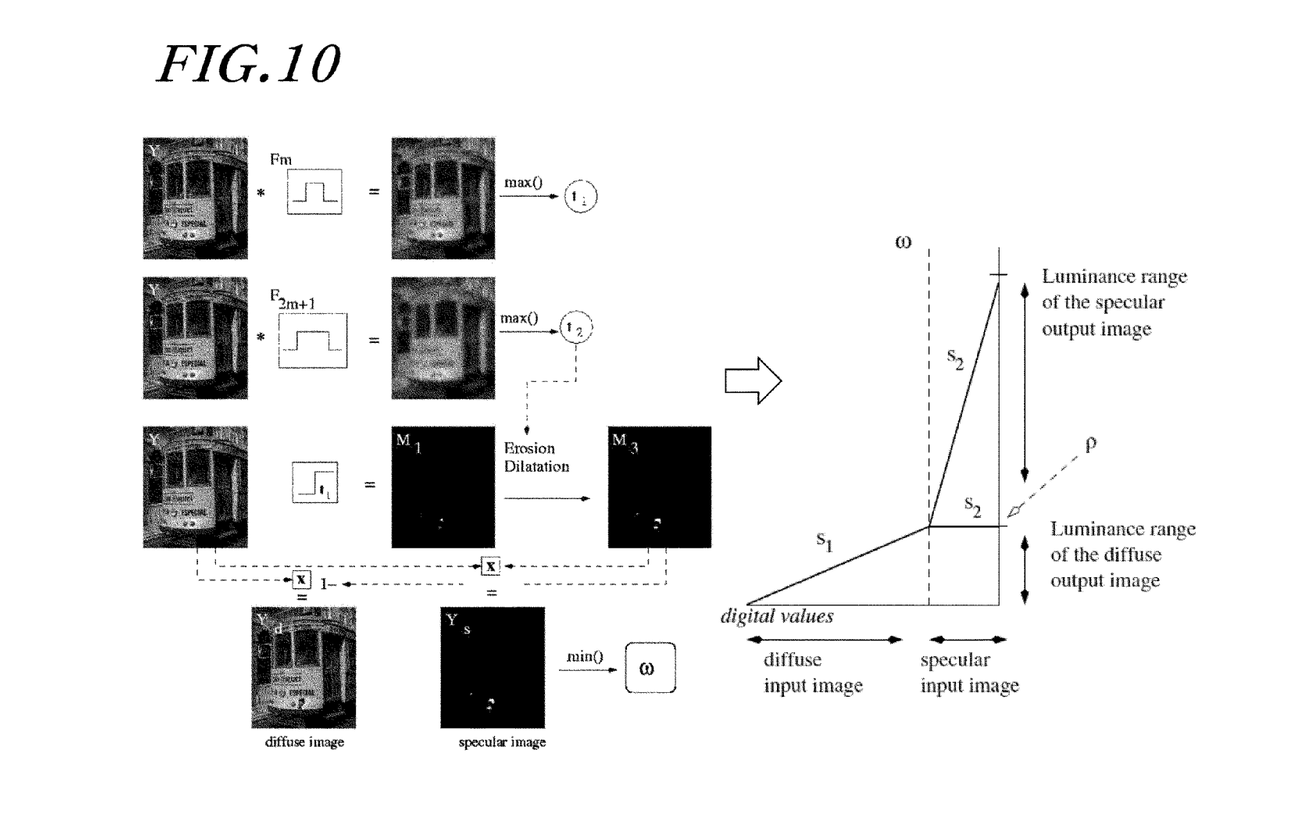
FIG. 10 is a view for explaining a second example of another inverse tone mapping method according to an embodiment.

FIG. 10 is a view for explaining a second example of another inverse tone mapping method.

As shown in FIG. 10, the image processing device 110 may distinguish a bright region and a dark region and apply different functions to each region. The method shown in FIG. 10 is a method in which a pixel value change range of a very bright region or a region including a light source in a low-contrast-ratio image is expanded more than those of other regions. This method is also called an inverse tone mapping method using a classification model, and the inverse tone mapping method using the classification model is an inverse tone mapping method applied on the assumption that a region that was brighter in the actual scene was not displayed bright enough due to the limitation of the low-contrast-ratio image.

Figure 11:
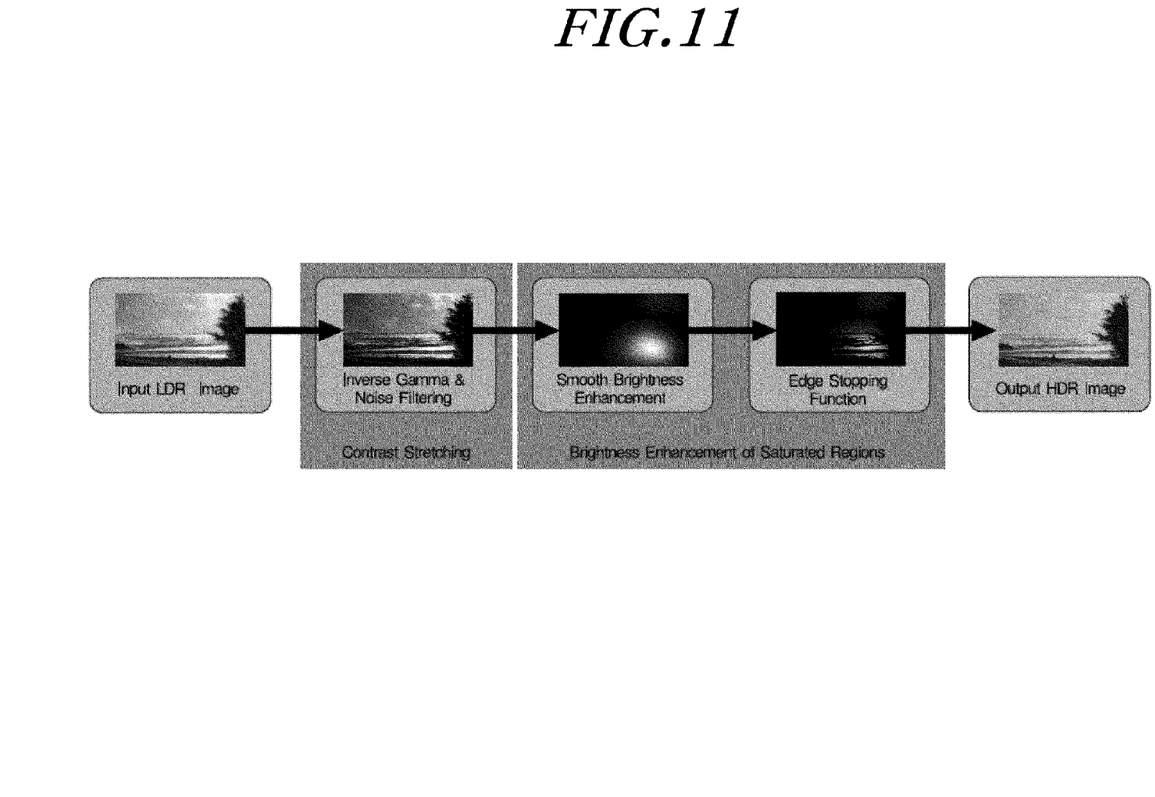
FIG. 11 is a view for explaining a third example of another inverse tone mapping method according to an embodiment.

FIG. 11 is a view for explaining a third example of another inverse tone mapping method.

The image processing device 110 may generate an expansion map indicating an expansion degree of a dynamic range for each pixel of an image by analyzing the image as shown in FIG. 11. Next, the image processing device 110 may expand pixel values of a low-contrast-ratio image according to the expansion map to generate a high-contrast-ratio image.

Referring to FIG. 11, the image processing device 110 may create an initial expansion map by setting a portion where the pixel value is larger than a specific value in the image as 1 and a portion in which the pixel value is the specific value or less as 0. Next, the image processing device 110 may apply a Gaussian blur to the expansion map to create an expansion map of a smooth luminance enhancement step. Next, the image processing device 110 may further consider edge information of an input image so that the expansion map does not invade the edge.

Figure 12:
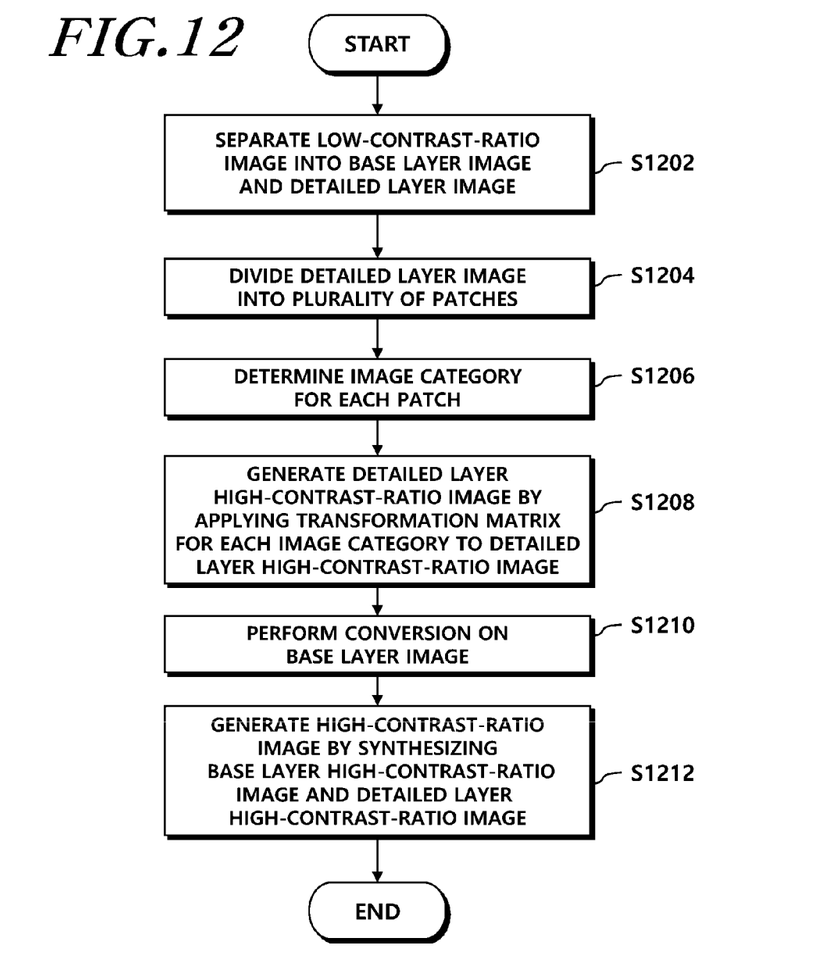
FIG. 12 is a flowchart showing a method of performing inverse tone mapping by separating an image into a base layer and a detailed layer according to an embodiment.

FIG. 12 is a flowchart showing a method of performing inverse tone mapping by separating an image into a base layer and a detailed layer.

Referring to FIG. 12, in operation S1202, the image processing device 110 may separate a low-contrast-ratio image into a low-contrast-ratio image of a base layer and a low-contrast-ratio image of a detailed layer using a separation filter. At this time, the image processing device 110 may separate an image into a plurality of depth levels. For example, the image processing device 110 may separate the low-contrast-ratio image of the base layer and the low-contrast-ratio image of the detailed layer for the plurality of depth levels using the separation filter more than twice.

In operation S1204, the image processing device 110 may divide the low-contrast-ratio image of the detailed layer into a plurality of patches.

Next, in operation S1206, the image processing device 110 may determine the image categories of each patch.

In operation S1208, when the image categories of each patch are determined, the image processing device 110 may convert each patch into a high-contrast-ratio image patch according to a transformation matrix learned for each image category to generate a high-contrast-ratio image of the detailed layer.

Next, in operation S1210, the image processing device 110 may apply one of an inverse tone mapping method using a global model, an inverse tone mapping method using a classification model, and an inverse tone mapping method using an expansion map to the low-contrast-ratio image of the base layer to generate a high-contrast-ratio image of the base layer.

When separating the low-contrast-ratio image of the base layer and the low-contrast-ratio image of the detailed layer for the plurality of depth levels, the image processing device 110 may apply the same inverse tone mapping method to the low-contrast-ratio image of the base layer of each depth level to generate the high-contrast-ratio image of the base layer.

Next, in operation S1212, the image processing device 110 may generate the high-contrast-ratio image by synthesizing the high-contrast-ratio image of the base layer and the high-contrast-ratio image of the detailed layer.

According to the embodiment described above, the inverse tone mapping may be performed using the transformation matrix that learns a correspondence relationship between the low-contrast-ratio image and the high-contrast-ratio image, thereby increasing the capability to restore the detailed information.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although an embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An inverse tone mapping method that converts a low-contrast-ratio image into a high-contrast-ratio image, comprising:
   separating the low-contrast-ratio image into a plurality of sublayer low-contrast-ratio images using at least one separation filter;
   dividing each sublayer low-contrast-ratio image into a plurality of patches;
   determining image categories of each patch;
   converting each patch into a high-contrast-ratio image patch in accordance with a transformation matrix learned for each image category to generate the high-contrast-ratio image; and
   generating the high-contrast-ratio image by synthesizing the high-contrast-ratio image patches,
   wherein at least one sublayer low-contrast-ratio image of the plurality of sublayer low-contrast-ratio images is generated in such a manner that the at least one separation filter is used more than twice.

2. The inverse tone mapping method of claim 1, wherein each of the sublayer low-contrast-ratio images is a terminal node image that is no longer separated by the at least one separation filter.

3. The inverse tone mapping method of claim 1, further comprising:
   converting a test high-contrast-ratio image into a test low-contrast-ratio image;
   separating the test high-contrast-ratio image into a plurality of sublayer test high-contrast-ratio images and separating the test low-contrast-ratio image into a plurality of sublayer test low-contrast-ratio images;
   dividing each sublayer test high-contrast-ratio image into a plurality of test high-contrast-ratio image patches and dividing each sublayer test low-contrast-ratio image into a plurality of test low-contrast-ratio image patches;
   determining image categories of each test low-contrast-ratio image patch; and
   learning the transformation matrix for each image category using the test low-contrast-ratio image patch corresponding to each image category and the test high-contrast-ratio image patch corresponding to the test low-contrast-ratio image patch.

4. The inverse tone mapping method of claim 3, wherein the test high-contrast-ratio image and the test low-contrast-ratio image are separated into sublayers by the at least one separation filter.

5. The inverse tone mapping method of claim 3, wherein the transformation matrix is learned by the following equation:

$$M_i = \arg\min\{\|Y_i^h - MY_i^l\|_2^2 + \lambda\|M\|_F^2\}, M \in R^{D \times D}$$

$$M_i = Y_i^h Y_i^{l^T}(Y_i^l Y_i^{l^T} + \lambda I)^{-1}, i=1,2,\ldots,1280$$

wherein $M_i$ denotes a transformation matrix for transforming a low-contrast-ratio image patch of an i-th group into a high-contrast-ratio image patch, $Y_i^h$ denotes a matrix constituting high-contrast-ratio image patches belonging to the i-th group, $Y_i^l$ denotes a matrix constituting low-contrast-ratio image patches belonging to the i-th group, M denotes a matrix for transforming a low-contrast-ratio image patch into a high-contrast-ratio image patch, $\lambda$ denotes a Lagrangian multiplier, $R^{D \times D}$ denotes real square matrices, $Y_i^{l^T}$ denotes an inverse matrix of $Y_i^l$, and I denotes an identity matrix.

6. An inverse tone mapping method that converts a low-contrast-ratio image into a high-contrast-ratio image, comprising:
   separating the low-contrast-ratio image into a plurality of sublayer low-contrast-ratio images using at least one separation filter;
   dividing each sublayer low-contrast-ratio image into a plurality of patches;
   determining image categories of each patch;
   converting each patch into a high-contrast-ratio image patch in accordance with a transformation matrix learned for each image category to generate the high-contrast-ratio image; and
   generating the high-contrast-ratio image by synthesizing the high-contrast-ratio image patches,
   wherein the at least one separation filter is one of a bilateral filter, a decomposition filter using total-variation energy, a wavelet filter, a Gabor filter, and a Gaussian filter.

7. An inverse tone mapping method that converts a low-contrast-ratio image into a high-contrast-ratio image, comprising:
   separating the low-contrast-ratio image into a plurality of sublayer low-contrast-ratio images using at least one separation filter;
   dividing each sublayer low-contrast-ratio image into a plurality of patches;
   determining image categories of each patch;
   converting each patch into a high-contrast-ratio image patch in accordance with a transformation matrix learned for each image category to generate the high-contrast-ratio image; and
   generating the high-contrast-ratio image by synthesizing the high-contrast-ratio image patches,
   wherein the image categories of each patch are determined by at least one or more factors of image signal change information using a luminance, a contrast, texture complexity, an edge direction, an edge strength, a color component, a texture pattern, a frequency, and a differential operator of each patch image, image signal change information using a Gaussian function, and image signal change information using a Laplacian function.

8. An inverse tone mapping method that converts a low-contrast-ratio image into a high-contrast-ratio image, comprising:
   separating the low-contrast-ratio image into a plurality of sublayer low-contrast-ratio images using at least one separation filter;
   dividing each sublayer low-contrast-ratio image into a plurality of patches;
   determining image categories of each patch;
   converting each patch into a high-contrast-ratio image patch in accordance with a transformation matrix learned for each image category to generate the high-contrast-ratio image; and
   generating the high-contrast-ratio image by synthesizing the high-contrast-ratio image patches,
   wherein the determining the image categories includes determining the image categories using a mean luminance of pixels included in each patch,
   wherein the determining the image categories includes determining the image categories by dividing pixels of each patch into a plurality of groups and comparing a reference group with a mean luminance of each group,
   wherein, in the determining the image categories, all groups excluding the reference group are displayed in such a manner that the pixels of each patch are divided into Q groups (Q is a natural number of 2 or greater) and the reference group and a mean luminance of each group are compared so that the each group is represented as 0 or 1, and the image categories are classified into $2^{\wedge}(Q-1)$ categories.

9. An inverse tone mapping method that converts a low-contrast-ratio image into a high-contrast-ratio image, comprising:
   separating the low-contrast-ratio image into a plurality of sublayer low-contrast-ratio images using at least one separation filter;
   dividing each sublayer low-contrast-ratio image into a plurality of patches;
   determining image categories of each patch;
   converting each patch into a high-contrast-ratio image patch in accordance with a transformation matrix learned for each image category to generate the high-contrast-ratio image; and
   generating the high-contrast-ratio image by synthesizing the high-contrast-ratio image patches,
   wherein the determining the image categories includes determining the image categories using a mean luminance of pixels included in each patch,
   wherein the determining the image categories includes determining the image categories by dividing pixels of each patch into a plurality of groups and comparing a reference group with a mean luminance of each group,
   wherein the determining the image categories includes dividing the pixels of each patch into a plurality of row groups and a plurality of column groups.

* * * * *